US009792776B2

(12) United States Patent
Bigelow, Jr. et al.

(10) Patent No.: US 9,792,776 B2
(45) Date of Patent: Oct. 17, 2017

(54) GAMING DEVICE HAVING FREE GAME BONUS WITH A CHANGING MULTIPLIER

(71) Applicant: IGT, Las Vegas, NV (US)

(72) Inventors: Robert F. Bigelow, Jr., Reno, NV (US); James A. Vasquez, Carson City, NV (US); Paulina Rodgers, Reno, NV (US); Anthony J. Baerlocher, Henderson, NV (US)

(73) Assignee: IGT, Las Vegas, NV (US)

( * ) Notice: Subject to any disclaimer, the term of this patent is extended or adjusted under 35 U.S.C. 154(b) by 933 days.

(21) Appl. No.: 14/143,747

(22) Filed: Dec. 30, 2013

(65) Prior Publication Data

US 2014/0113703 A1 Apr. 24, 2014

Related U.S. Application Data

(63) Continuation of application No. 13/906,011, filed on May 30, 2013, now Pat. No. 8,647,194, which is a (Continued)

(51) Int. Cl.
*A63F 13/00* (2014.01)
*G07F 17/34* (2006.01)
*G07F 17/32* (2006.01)

(52) U.S. Cl.
CPC .............. *G07F 17/34* (2013.01); *G07F 17/32* (2013.01); *G07F 17/3244* (2013.01); *G07F 17/3267* (2013.01)

(58) Field of Classification Search
CPC .................................................... G07F 17/3267
(Continued)

(56) References Cited

U.S. PATENT DOCUMENTS 2,545,644 A 3/1951 Benton et al.
4,198,052 A 4/1980 Gauselmann
(Continued)

FOREIGN PATENT DOCUMENTS

AU 199716432 B2 9/1997
AU A-50327/96 10/1997
(Continued)

OTHER PUBLICATIONS

1DU Dice Unit Advertisement [online] [retrieved from the Internet May 14, 2001] <URL:http://starpoint.uk.com/1du.html>.
(Continued)

*Primary Examiner* — David L Lewis
*Assistant Examiner* — Robert Mosser
(74) *Attorney, Agent, or Firm* — Neal, Gerber & Eisenberg LLP

(57) ABSTRACT

The present invention includes an apparatus and method for a bonus game, and particularly a free spin bonus with an incrementing multiplier. The bonus game includes a plurality of reels having a plurality of symbols and multipliers. The gaming device provides a number of free spins to the player at the beginning of the bonus game. The multiplier preferably starts at "1×" and increases by one after each free spin. Initially, the player spins the reels attempting to obtain a winning symbol combination on the reels. If the player obtains a winning combination, the gaming device provides an award. The award is multiplied by the multiplier and the player receives the multiplied award for that free spin. The player continues to spin the reels until there are no free spins remaining in the bonus game.

20 Claims, 8 Drawing Sheets

Related U.S. Application Data continuation of application No. 13/222,473, filed on Aug. 31, 2011, now Pat. No. 8,460,094, which is a continuation of application No. 11/840,048, filed on Aug. 16, 2007, now Pat. No. 8,029,358, which is a continuation of application No. 10/086,146, filed on Feb. 28, 2002, now Pat. No. 7,258,611.

(58) Field of Classification Search
USPC .............................................. 463/16, 20, 25
See application file for complete search history.

(56) References Cited

U.S. PATENT DOCUMENTS

| | | | |
|---|---|---|---|
| 4,258,838 | A | 3/1981 | Rockola et al. |
| 4,410,178 | A | 10/1983 | Partridge |
| 4,448,419 | A | 5/1984 | Telnaes |
| 4,513,970 | A | 4/1985 | Opresco et al. |
| 4,560,161 | A | 12/1985 | Hamano |
| 4,582,324 | A | 4/1986 | Koza et al. |
| 4,586,713 | A | 5/1986 | Abu-Shumays et al. |
| 4,618,150 | A | 10/1986 | Kimura |
| 4,624,459 | A | 11/1986 | Kaufman |
| 4,695,053 | A | 9/1987 | Vazquez, Jr. et al. |
| 4,706,956 | A | 11/1987 | Abu-Shumays et al. |
| 4,756,531 | A | 7/1988 | DiRe et al. |
| 4,805,907 | A | 2/1989 | Haiwara |
| 4,817,952 | A | 4/1989 | Biro et al. |
| 4,836,553 | A | 6/1989 | Suttle et al. |
| 4,838,552 | A | 6/1989 | Haiwara |
| 4,844,467 | A | 7/1989 | Gyenge et al. |
| 4,861,041 | A | 8/1989 | Jones et al. |
| 4,871,171 | A | 10/1989 | Rivero |
| 4,874,173 | A | 10/1989 | Kishishita |
| 4,889,340 | A | 12/1989 | Greene |
| 4,991,848 | A | 2/1991 | Greenwood et al. |
| 5,019,973 | A | 5/1991 | Wilcox et al. |
| 5,033,744 | A | 7/1991 | Bridgeman et al. |
| 5,085,436 | A | 2/1992 | Bennett |
| 5,092,598 | A | 3/1992 | Kamille |
| 5,098,107 | A | 3/1992 | Boylan et al. |
| 5,102,134 | A | 4/1992 | Smyth |
| 5,102,137 | A | 4/1992 | Ekiert |
| 5,167,413 | A | 12/1992 | Fulton |
| 5,178,390 | A | 1/1993 | Okada |
| 5,205,555 | A | 4/1993 | Hamano |
| 5,209,479 | A | 5/1993 | Nagao et al. |
| 5,211,399 | A | 5/1993 | Howard |
| 5,249,800 | A | 10/1993 | Hilgendorf et al. |
| 5,259,616 | A | 11/1993 | Bergmann |
| 5,288,077 | A | 2/1994 | Jones |
| 5,288,081 | A | 2/1994 | Breeding |
| 5,332,219 | A | 7/1994 | Marnell, II et al. |
| 5,342,047 | A | 8/1994 | Heidel et al. |
| 5,342,049 | A | 8/1994 | Wichinsky et al. |
| 5,356,160 | A | 10/1994 | Urlwin |
| 5,362,052 | A | 11/1994 | Kubatsch |
| 5,364,100 | A | 11/1994 | Ludlow et al. |
| 5,364,105 | A | 11/1994 | Jones |
| 5,377,973 | A | 1/1995 | Jones et al. |
| 5,393,057 | A | 2/1995 | Marnell, II |
| 5,393,061 | A | 2/1995 | Manship et al. |
| 5,395,111 | A | 3/1995 | Inoue |
| 5,407,200 | A | 4/1995 | Zalabak |
| 5,423,539 | A | 6/1995 | Nagao |
| 5,429,507 | A | 7/1995 | Kaplan |
| 5,431,407 | A | 7/1995 | Hofberg et al. |
| 5,437,462 | A | 8/1995 | Breeding |
| 5,449,173 | A | 9/1995 | Thomas |
| 5,452,899 | A | 9/1995 | Skratulia et al. |
| 5,456,465 | A | 10/1995 | Durham |
| 5,490,670 | A | 2/1996 | Hobert |
| 5,494,287 | A | 2/1996 | Manz |
| 5,511,781 | A | 4/1996 | Wood et al. |
| 5,524,888 | A | 6/1996 | Heidel |
| 5,529,309 | A | 6/1996 | Bartlett |
| 5,531,440 | A | 7/1996 | Dabrowski et al. |
| 5,531,441 | A | 7/1996 | Dabrowski et al. |
| 5,536,016 | A | 7/1996 | Thompson |
| 5,542,669 | A | 8/1996 | Charron et al. |
| 5,560,603 | A | 10/1996 | Seelig et al. |
| 5,569,084 | A | 10/1996 | Nicastro et al. |
| 5,577,731 | A | 11/1996 | Jones |
| 5,584,485 | A | 12/1996 | Jones et al. |
| 5,607,162 | A | 3/1997 | Boylan et al. |
| 5,611,535 | A | 3/1997 | Tiberio |
| 5,626,341 | A | 5/1997 | Jones et al. |
| 5,642,882 | A | 7/1997 | Guerzini |
| 5,642,884 | A | 7/1997 | Pitcher |
| 5,647,798 | A | 7/1997 | Falciglia |
| 5,655,965 | A | 8/1997 | Takemoto et al. |
| 5,660,391 | A | 8/1997 | Klasee |
| 5,660,393 | A | 8/1997 | Dreger |
| 5,664,781 | A | 9/1997 | Feola |
| 5,711,525 | A | 1/1998 | Breeding |
| D392,340 | S | 3/1998 | DeSimone |
| 5,722,891 | A | 3/1998 | Inoue |
| 5,732,948 | A | 3/1998 | Yoseloff |
| 5,743,524 | A | 4/1998 | Nannicola |
| 5,752,881 | A | 5/1998 | Inoue |
| 5,766,074 | A | 6/1998 | Cannon et al. |
| 5,769,716 | A | 6/1998 | Saffari et al. |
| 5,772,506 | A | 6/1998 | Marks et al. |
| 5,772,509 | A | 6/1998 | Weiss |
| 5,775,692 | A | 7/1998 | Watts et al. |
| 5,788,573 | A | 8/1998 | Baerlocher et al. |
| 5,794,964 | A | 8/1998 | Jones et al. |
| 5,795,225 | A | 8/1998 | Jones et al. |
| 5,807,172 | A | 9/1998 | Piechowiak |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,836,041 | A | 11/1998 | Kleinpell, II et al. |
| 5,848,932 | A | 12/1998 | Adams |
| 5,851,148 | A | 12/1998 | Brune et al. |
| 5,855,514 | A | 1/1999 | Kamille |
| 5,863,041 | A | 1/1999 | Boylan et al. |
| 5,873,781 | A | 2/1999 | Keane |
| 5,882,261 | A | 3/1999 | Adams |
| 5,885,157 | A | 3/1999 | Harada et al. |
| 5,890,962 | A | 4/1999 | Takemoto |
| 5,911,418 | A | 6/1999 | Adams |
| 5,918,880 | A | 7/1999 | Voigt, IV et al. |
| 5,919,088 | A | 7/1999 | Weiss |
| 5,927,714 | A | 7/1999 | Kaplan |
| 5,934,672 | A | 8/1999 | Sines et al. |
| 5,935,002 | A | 8/1999 | Falciglia |
| 5,947,820 | A | 9/1999 | Morro et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,971,849 | A | 10/1999 | Falciglia |
| 5,980,384 | A | 11/1999 | Barrie |
| 5,984,781 | A | 11/1999 | Sunaga |
| 5,988,638 | A | 11/1999 | Rodesch et al. |
| 5,996,997 | A | 12/1999 | Kamille |
| 5,997,400 | A | 12/1999 | Seelig et al. |
| 5,997,401 | A | 12/1999 | Crawford |
| 6,003,867 | A | 12/1999 | Rodesch et al. |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,978 | A | 5/2000 | Martino et al. |
| 6,062,980 | A | 5/2000 | Luciano |
| 6,086,066 | A | 7/2000 | Takeuchi et al. |
| 6,089,976 | A | 7/2000 | Schneider et al. |
| 6,089,978 | A | 7/2000 | Adams |
| 6,093,102 | A | 7/2000 | Bennett |

(56) References Cited

U.S. PATENT DOCUMENTS 6,095,921 A 8/2000 Walker et al.
6,102,400 A 8/2000 Scott et al.
6,102,798 A 8/2000 Bennett
6,117,009 A 9/2000 Yoseloff
6,120,031 A 9/2000 Adams
6,120,377 A 9/2000 McGinnis, Sr. et al.
6,120,378 A 9/2000 Moody
6,126,541 A 10/2000 Fuchs
6,126,542 A 10/2000 Fier
6,135,885 A 10/2000 Lermusiaux
6,142,873 A 11/2000 Weiss et al.
6,142,874 A 11/2000 Kodachi et al.
6,142,875 A 11/2000 Kodachi et al.
6,146,273 A 11/2000 Olsen
6,149,156 A 11/2000 Feola
6,149,521 A 11/2000 Sanduski
6,155,925 A 12/2000 Giobbi et al.
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,179,711 B1 1/2001 Yoseloff
6,190,254 B1 2/2001 Bennett
6,190,255 B1 2/2001 Thomas et al.
6,200,217 B1 3/2001 Osawa
6,203,409 B1 3/2001 Kennedy et al.
6,203,428 B1 3/2001 Giobbi et al.
6,203,429 B1 3/2001 Demar et al.
6,210,279 B1 4/2001 Dickinson
6,213,875 B1 4/2001 Suzuki
6,213,876 B1 4/2001 Moore, Jr.
6,217,448 B1 4/2001 Olsen
6,220,959 B1 4/2001 Holmes, Jr. et al.
6,224,483 B1 5/2001 Mayeroff
6,224,484 B1 5/2001 Okuda et al.
6,227,970 B1 5/2001 Shimizu et al.
6,231,442 B1 5/2001 Mayeroff
6,231,445 B1 5/2001 Acres
6,234,897 B1 5/2001 Frohm et al.
6,238,287 B1 5/2001 Komori et al.
6,238,288 B1 5/2001 Walker et al.
6,241,607 B1 6/2001 Payne et al.
6,251,013 B1 6/2001 Bennett
D445,841 S 7/2001 Sabo
6,261,177 B1 7/2001 Bennett
6,270,408 B1 8/2001 Sakamoto et al.
6,270,409 B1 8/2001 Shuster
6,270,411 B1 8/2001 Gura et al.
6,270,412 B1 8/2001 Crawford et al.
6,287,194 B1 9/2001 Okada et al.
6,290,600 B1 9/2001 Glasson
6,296,568 B1 10/2001 Tracy
6,299,165 B1 10/2001 Nagano
6,302,790 B1 10/2001 Brossard
6,305,686 B1 10/2001 Perrie et al.
6,309,300 B1 10/2001 Glavich
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,315,664 B1 11/2001 Baerlocher et al.
6,319,124 B1 11/2001 Baerlocher
6,322,309 B1 11/2001 Thomas et al.
6,328,649 B1 12/2001 Randall et al.
6,334,814 B1 1/2002 Adams
6,336,860 B1 1/2002 Webb
6,336,863 B1 1/2002 Baerlocher et al.
6,340,158 B2 1/2002 Pierce et al.
6,346,043 B1 2/2002 Colin et al.
6,347,996 B1 2/2002 Gilmore et al.
6,358,147 B1 3/2002 Jaffe et al.
6,364,768 B1 4/2002 Acres et al.
6,368,216 B1 4/2002 Hedrick et al.
6,375,187 B1 4/2002 Baerlocher
6,394,902 B1 5/2002 Glavich et al.
D458,311 S 6/2002 Seelig et al.
6,398,218 B1 6/2002 Vancura
6,398,644 B1 6/2002 Perrie et al.
6,406,369 B1 6/2002 Baerlocher et al.
6,413,160 B1 7/2002 Vancura
6,413,161 B1 7/2002 Baerlocher et al.
6,413,162 B1 7/2002 Baerlocher et al.
6,416,408 B2 7/2002 Tracy et al.
6,419,579 B1 7/2002 Bennett
6,425,824 B1 7/2002 Baerlocher et al.
6,435,511 B1 8/2002 Vancura et al.
6,439,995 B1 8/2002 Hughs-Baird et al.
D463,504 S 9/2002 Stephan
6,443,452 B1 9/2002 Brune
6,443,837 B1 9/2002 Jaffe et al.
6,454,266 B1 9/2002 Breeding et al.
6,454,651 B1 9/2002 Yoseloff
6,461,241 B1 10/2002 Webb et al.
6,464,582 B1 10/2002 Baerlocher et al.
6,468,156 B1 10/2002 Hughs-Baird et al.
6,471,208 B2 10/2002 Yoseloff et al.
6,481,713 B2 11/2002 Perrie et al.
6,491,584 B2 12/2002 Graham et al.
6,494,785 B1 12/2002 Gerrard et al.
6,506,114 B1 1/2003 Estes et al.
6,506,118 B1 1/2003 Baerlocher et al.
6,511,375 B1 1/2003 Kaminkow
6,514,141 B1 2/2003 Kaminkow et al.
6,533,658 B1 3/2003 Walker et al.
6,537,150 B1 3/2003 Luciano et al.
6,537,152 B2 3/2003 Seelig et al.
6,551,187 B1 4/2003 Jaffe
6,554,703 B1 4/2003 Bussick et al.
6,558,253 B1 5/2003 DeSimone et al.
6,558,254 B2 5/2003 Baelocher et al.
6,561,904 B2 5/2003 Locke et al.
6,565,436 B1 5/2003 Baerlocher
6,569,015 B1 5/2003 Baerlocher et al.
6,569,016 B1 5/2003 Baerlocher
6,572,471 B1 6/2003 Bennett
6,572,473 B1 6/2003 Baerlocher
6,575,830 B2 6/2003 Baerlocher et al.
6,585,591 B1 7/2003 Baerlocher et al.
6,589,114 B2 7/2003 Rose
6,592,457 B1 7/2003 Frohm et al.
6,595,854 B2 7/2003 Hughs-Baird et al.
6,599,185 B1 7/2003 Kaminkow et al.
6,599,192 B1 7/2003 Baerlocher et al.
6,602,137 B2 8/2003 Kaminkow et al.
6,604,740 B1 8/2003 Singer et al.
6,605,002 B2 8/2003 Baerlocher
6,607,437 B2 8/2003 Casey et al.
6,607,438 B2 8/2003 Baerlocher et al.
6,609,974 B2 8/2003 Mead et al.
6,632,139 B1 10/2003 Baerlocher
6,632,141 B2 10/2003 Webb et al.
6,634,941 B2 10/2003 Olive
6,634,943 B1 10/2003 Baerlocher
6,638,164 B2 10/2003 Randall et al.
6,644,664 B2 11/2003 Muir et al.
6,676,512 B2 1/2004 Fong et al.
6,688,977 B1 2/2004 Baerlocher et al.
6,719,630 B1 4/2004 Seelig et al.
6,733,389 B2 5/2004 Webb et al.
6,746,329 B1 6/2004 Duhamel
6,805,349 B2 10/2004 Baerlocher et al.
6,869,360 B2 3/2005 Marks et al.
6,913,532 B2 7/2005 Baerlocher et al.
6,921,335 B2 7/2005 Rodgers et al.
6,932,700 B2 8/2005 Bennett et al.
6,955,600 B2 10/2005 Glavich et al.
6,971,954 B2 12/2005 Randall et al.
7,070,501 B2 7/2006 Cormack

(56) References Cited

U.S. PATENT DOCUMENTS

| | | | |
|---|---|---|---|
| 7,147,559 | B2 | 12/2006 | Englman |
| 7,238,110 | B2 | 7/2007 | Glavich et al. |
| 2001/0009865 | A1 | 7/2001 | Demar |
| 2001/0048193 | A1 | 12/2001 | Yoseloff et al. |
| 2002/0010017 | A1 | 1/2002 | Bennett |
| 2002/0019255 | A1 | 2/2002 | Randall |
| 2002/0025844 | A1 | 2/2002 | Casey et al. |
| 2002/0045475 | A1 | 4/2002 | Glavich et al. |
| 2002/0072402 | A1 | 6/2002 | Baerlocher |
| 2002/0094857 | A1 | 7/2002 | Meyer |
| 2002/0142822 | A1 | 10/2002 | Baerlocher et al. |
| 2002/0151350 | A1 | 10/2002 | Baerlocher et al. |
| 2002/0155883 | A1 | 10/2002 | Baerlocher |
| 2003/0013514 | A1 | 1/2003 | Cregan et al. |
| 2003/0040355 | A1 | 2/2003 | Baerlocher |
| 2003/0045344 | A1 | 3/2003 | Webb et al. |
| 2003/0045348 | A1 | 3/2003 | Palmer et al. |
| 2003/0054875 | A1 | 3/2003 | Marks et al. |
| 2003/0060272 | A1 | 3/2003 | Glavich et al. |
| 2003/0064795 | A1 | 4/2003 | Baerlocher et al. |
| 2003/0069053 | A1 | 4/2003 | Dovgan |
| 2003/0073483 | A1 | 4/2003 | Glavich et al. |
| 2003/0162585 | A1 | 8/2003 | Bigelow, Jr. et al. |
| 2004/0009803 | A1 | 1/2004 | Bennett et al. |
| 2004/0038731 | A1 | 2/2004 | Englman |
| 2005/0049035 | A1 | 3/2005 | Baerlocher et al. |
| 2005/0104298 | A1 | 5/2005 | Butcher et al. |
| 2005/0266917 | A1 | 12/2005 | Glavich et al. |

FOREIGN PATENT DOCUMENTS

| | | | |
|---|---|---|---|
| AU | A 63553 98 | | 10/1998 |
| AU | 200177369 | | 4/2002 |
| AU | 778685 | | 4/2005 |
| DE | 4014477 | A1 | 7/1991 |
| EP | 0410789 | A2 | 7/1990 |
| EP | 0410789 | A3 | 7/1990 |
| EP | 0 688 645 | A2 | 12/1995 |
| EP | 0688002 | A1 | 12/1995 |
| EP | 0 798 676 | A1 | 10/1997 |
| EP | 0 874 337 | A1 | 10/1998 |
| EP | 0 926 645 | A2 | 6/1999 |
| EP | 0 945 837 | A2 | 9/1999 |
| EP | 0944030 | A2 | 9/1999 |
| EP | 0 981 119 | A2 | 2/2000 |
| EP | 0 984 409 | A2 | 3/2000 |
| EP | 0984409 | A2 | 8/2000 |
| EP | 1063622 | | 12/2000 |
| GB | 2 072 395 | A | 9/1981 |
| GB | 2 083 936 | A | 3/1982 |
| GB | 2 092 797 | | 8/1982 |
| GB | 2 144 644 | A | 3/1985 |
| GB | 2 201 821 | A | 9/1988 |
| GB | 2 202 984 | A | 10/1988 |
| GB | 2 253 300 | A | 2/1992 |
| GB | 2 332 217 | A | 8/1998 |
| GB | 2 328 311 | A | 2/1999 |
| JP | 2000-317075 | A | 11/2000 |
| JP | 2001-314560 | A | 11/2001 |
| WO | WO 93/03464 | | 2/1993 |
| WO | WO 9732285 | | 9/1997 |
| WO | WO 98 23963 | | 6/1998 |
| WO | WO 00 12186 | | 3/2000 |
| WO | WO 00/32286 | | 6/2000 |
| WO | WO 01/26019 | A1 | 4/2001 |
| WO | WO 01/93966 | | 12/2001 |

OTHER PUBLICATIONS

3-Way Action Poker Brochure and Article written by written by IGT, published in 2002.
Addams Family Advertisement and Article written by IGT, Strictly Slots, published in 2000.
American Thunder Screen Shots written by IGT, published in 1998.
Bally Slot Machines Electro-Mechanicals 1964-1980 Book, Revised 3rd Edition [In Part] written by Marshall Fey.
Big Bang Piggy Bankin Advertisement written by WMS Gaming, Inc., published prior to 2000, on or before December thereof.
Bonus Times written by Bally Gaming, published in 2000.
Bunco Night Advertisement, International Game Technology, 2002, on or before December there of.
By George Advertisement, International Game Technology, 2002, on or before December thereof.
Cash box Advertisement & Article written by anchor Games, Strictly Slots, published in 2000, on or before December thereof.
Cash Crop Brochure written by Arist O Crat Leisure Industries, published in 1997.
Catch a Wave Advertisement written by IGT, published in Dec. 2000.
Chutes & Ladders Game Instructions written by Hasbro-Milton Bradley, published in 1999, on or before December thereof.
Cuckoo Aristocrat Brochure written by Aristocrat, published in Feb. 1998.
Dice Games Article describing Poker dice, published prior to 2001, on or before December thereof.
Dolphin Treasure Advertisement, written by Aristocrat Leisure Industries Pty., Ltd., published in 1996, in or before December thereof.
DoubleBucks Brochure written by IGT (not dated).
Enchanted Unicorn Advertisement written by IGT, published in 2001.
Faster Harder More Challenging Q'bert game description [online] [retrieved from the Internet Mar. 12, 2002] written by The Killer List of Videogames, <URL:http://www.klov.com/F/Faster_Harder_More_Challenging_Qbert.html>.
Field Testing New Slots Article, written by Strictly Slots, published in Jul. 2000.
Fire and Fortune Article in Strictly Slots, Anchor Games, May 2001.
Fox "N" Hound Advertisement written by IGT, published in 2002, on or before December thereof.
Free! 7-Day Trial on Daval's Reel dice Advertisement written by Gerber & Glass published in 1936, on or before December thereof.
Fundamentals of Craps Book [In Part], written by mason Malmuth and Lynne Loomis, published in 1995, on or before December thereof.
Ghoulish Gamble Advertisement, written by Konami Australia Pty Ltd,. published prior to Sep. 2000.
Good times Brochure written by IGT, published in 1999, on or before December thereof.
Gotlieb Emulator Project written by Lee Taylor, [online] [retrieve from the Internet Mar. 12, 2002] <URL: http://www.defender.demon.co.uk/qbert.html>.
How to Play Q'bert, written by Gottlieb Amusement Games [online] [printed on Mar. 12, 2002]. Retrieved from the Internet at <URL:http://www.coinop.org/features/qbstory.html>.
In Between Game Description written by IGT, available prior to 2000, on or before December thereof.
Jackpot Party Brochures and Articles, written by WMS Gaming, Inc., published in 1998, on or before December thereof.
Leopard Spots (website) [online] [retrieved from the internet Mar. 12, 2001] <URL:www.igt.com>.
Levy Patent Abstract, written by Derwent publications Ltd., published in 1991, on or before December thereof.
Loaded Dice Strictly Slots Article, Konami, Dec. 2000.
Love Lucy Advertisement written by IGT, published in 2002, on or before December thereof.
Mega Multiplier® (website) written by www.wmsgaming.com, printed May 22, 2001.
Mikohn Solutions Article in the World Gaming Congress 2000 Edition, on or before December thereof.
Money Grab (website) written by www.wmsgaming.com, printed May 22, 2001.
Money Grab Article written by Strictly Slots, published in Apr. 2001.
Money Mouse Brochure written by Arist O Crat Leisure Industries, published in 1997.

(56) References Cited

OTHER PUBLICATIONS

Monopoly Brochures and Articles written by WMS Gaming, Inc. published in 1998, on or before December thereof.
Monopoly Party Train Article written by Strictly Slots, published Feb. 2002.
Neon Nights written by IGT, published in 2000, on or before December thereof.
New Kids Article written by Strictly Slots published in Dec. 2000.
On the Money Article written by Strictly Slots, Casino Data Systems, published in Dec. 2000.
Penguin Pays written in Commentary in Strictly Slots/Aristocrat in Apr. 1999.
Pick'em Poker Plus Advertisement written by Ball Gaming Systems in 2002.
Polly & Roger Brochure written by VLC, Inc, published in 2000.
Price is Right "Cliff Hangers" description [online] [printed on Mar. 21, 2001]. Retrieved from the Internet at <URL:http://www.geocities.com;members.aol.com>.
Price is Right "Showcases" Description [online] [retrieved from the Internet Mar. 16, 2001] <URL:schuminweb.com>.
Q'bert Board Game Instructions written by Parker Brothers, published in 1983, in or before December thereof.
Q'bert Game Description written by The Killer List of Videogames [online] [printed by Mar. 12, 2002]. Retrieved from the Internet at <URL:http://www.klov.com/Q/Qbert.html>.
Q'bert Qubes Game Description written by The Killer List of Videogames [online] [printed on Mar. 12, 2002]. Retrieved from the Internet at <URL:http://www.klov.com/Q/Qbert's_Qubes.html>.
Q'bert Video Game Advertisement for PlayStation, [online] [printed on Mar. 12, 2002] Retrieved from the Internet at <URL:http://www.amazon.com>.
Q'bert Video Game Advertisement written by Pennsylvania Gameroom Warehouse [online] [printed on Mar. 12, 2002]. Retrieved from the Internet at <URL:http://www.gameroomwarehouse.com/videogame/qbert.html>.
Q'bert video game cartridge instructions for ATARI 2600 game system written by Parker Brothers [online] [retrieved from the Internet Feb. 12, 2002] <URL:http://www.hasbro.com/default.asp?x=cc$_{13}$ gameandtoyinstructions>.
Q'bert video game cartridge instructions for ATARI home computer written by Parker Brothers and Arcade/Action Software, [online] [retrieved from the Internet Mar. 12, 2002] <URL://http://www.hasbro.com/default.asp?x=cc__gameandtoyinstructions>.
Q'bert video game cartridge instructions for Colecovision game system written by Parker Brothers, [online] [retrieved from the Internet Mar. 12, 2002] <URL:http://www.hasbro.com/default.asp?x=cc__gameandtoyinstructions>.
Q'bert video game cartridge instructions for Commodore 64 game system written by Parker Brothers and Arcade/Action Software, [online] [retrieved from the Internet Mar. 12, 2002] <URL:http://www.hasbro.com/default.asp?x=cc__gameandtoyinstructions>.
Q'bert video game cartridge instructions for Intellivision game system written by Parker Brothers, [online] [retrieved from the Internet Mar. 12, 2002] <URL:http://www.hasbro.com/default.asp?x=cc__gameandtoyinstructions>.
Q'bert video game cartridge instructions for Texas Instrument 99/4A game system written by Parker Brothers and Arcade/Action Software, [online] [retrieved from the Internet Mar. 12, 2002] <URL:http://www.hasbro.com/default.asp?x=cc__gameandtoyinstructions>.
Q'bert: Classic Video Game surrealism from the Golden Age of Arcade Games written by e-glide, [online] [printed on Mar. 12, 2002]. Retrieved from the Internet at <URL:http://www.users.rcn.com/e-glide/qbert2.html>.
Richard Petty Advertisement written by IGT, published in 2000, on or before December thereof.
Roll and Win Advertisement, written by WMS Gaming, [online] [printed on Jun. 8, 2001]. Retrieved from the Internet at <URL:http://www.wmsgaming.com>.
Slot Machines a Pictorial History of the First 100 Years, 5th Edition [In Part] written by Marshall Fey, published 1983 to 1997, on or before December thereof.
Slot Machines Article by Marshall Fey, published 1983, 1989, 1991, 1994 and 1997 on or before December thereof.
Slot Machines Buyer's Handbook, A Consumer's Guide to Slot Machines written by David L. Saul and Daniel R. mead, published on 1998 in or before December thereof.
Slot Machines on Parade [In Part], written by Robert N. Geddes and illustrated by Daniel R. Mead, published on 1980, in or before December thereof.
Spam Article written by IGT, published in 2002, on or before December thereof.
Spell Binder Advertisement written by IGT, published in 2000, on or before December thereof.
Spin Til You Win Game Description, written by IGT, published Oct. 21, 1996.
Stars, Bars and Bones Game Description written by P & M Coins, Inc., available 1997, on or before December thereof.
Statement of Grounds and Particulars, dated Jul. 8, 2009, Australian Patent application No. 2003216325.
Super Cherry Advertisement written by IGT, published in 2001, on or before December thereof.
Take Your Pick Advertisement written by IGT/Anchor Gaming, published in 1999, on or before December thereof.
Take Your Pick Article written by Strictly Slots, published in Mar. 2001.
Texas Tea Advertisement written by IGT, written by IGT, published in 2000, on or before December thereof.
The Creation of Q'bert written by Warren Davis, [online] [printed on Mar. 12, 2002]. Retrieved from the Internet at <URL:http://www.coinop.org/features/qbstory.html>.
The History of Q'bert written by Jeff Lee, [online] [printed on Mar. 12, 2002]. Retrieved from the Internet at <URL:http://www.users.aol.com/JPMLee/qbert.html>.
Top Cat Brochure written by WMS Gaming, Inc., published prior to 2001.
Top Dollar Brochure written by IGT, published in 1998, on or before December thereof.
Treasure Tunnel, Treasure Wheel Brochure written by Sigma Game, Inc., published prior to 2001.
Triple Bucks Advertisement written by IGT, published in 1999.
Vision Series Good Times Brochure written by IGT, published in 1999, on or before December thereof.
Vision Series™/Good Times™ written by IGT, published in 1999.
Wheel Poker Article written by Strictly Slots (Anchor Games), published in Nov. 2000.
Winning Bid Advertisement written by WMS Gaming Inc., published prior to Jan. 2001.
Winning Streak Web Site Description written by WMS Gaming Inc. (web site), printed on Mar. 21, 2001.
X Factor Brochure and Website Page written by WMS Gaming, Inc., published in 1998.
Yahtzee Bonus Advertisement, written by Mikohn Winning Solutions Worldwide, published in 1999, on or before December thereof.
Yahtzee Video Game Advertisement, written by Mikohn Winning Solutions Worldwide, published 1999.
Letter from Reina Kakimoto of Mots Law dated Feb. 22, 2012 regarding Third Party Submission in Published Application Under 37 C.F.R. 1.99 filed for U.S. Appl. No. 13/222,473 (1 page).
Third Party Submission in Published Application Under 37 C F.R. 1.99 filed for U.S. Appl. No. 13/222,473, dated Feb. 22, 2012 (3 pages).
Partially-highlighted JP 2000-317075A and English translation of paragraph [0038] of same submitted with Third Party Submission in Published Application Under 37 C.F.R. 1.99 for U.S. Appl. No. 13/222,473, dated Feb. 22, 2012 (3 pages).
Partially-highlighted JP 2001-314560A and English translation of paragraph [0008] of same submitted with Third Party Submission in Published Application Under 37 C.F.R. 1.99 for U.S. Appl. No. 13/222,473, dated Feb. 22, 2012 (3 pages).

GAMING DEVICE HAVING FREE GAME BONUS WITH A CHANGING MULTIPLIER

PRIORITY CLAIM

This application is a continuation of, and claims priority to and the benefit of, U.S. patent application Ser. No. 13/906,011, filed on May 30, 2013, which issued as U.S. Pat. No. 8,647,194 on Feb. 11, 2014, which is a continuation of, and claims priority to and the benefit of, U.S. patent application Ser. No. 13/222,473, filed on Aug. 31, 2011, which issued as U.S. Pat. No. 8,460,094 on Jun. 11, 2013, which is a continuation of, and claims priority to and the benefit of, U.S. patent application Ser. No. 11/840,048, filed on Aug. 16, 2007, which issued as U.S. Pat. No. 8,029,358 on Oct. 4, 2011, which is a continuation of, and claims priority to and the benefit of, U.S. patent application Ser. No. 10/086,146, filed on Feb. 28, 2002, which issued as U.S. Pat. No. 7,258,611 on Aug. 21, 2007, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a free game bonus with a multiplier that changes for each free game.

BACKGROUND OF THE INVENTION

Gaming machine manufacturers constantly strive to make gaming machines that maximize enjoyment and excitement for players. Providing a bonus game in which a player has an opportunity to win potentially large awards or credits in addition to the awards associated with the base game of the gaming machine is one way to enhance player enjoyment and excitement.

Known gaming devices having bonus games employ a triggering event that occurs during play of the base game of the gaming device. The triggering event temporarily stalls or halts the base game play and enables a player to enter a second, different game, which is the bonus game. The player plays the bonus game, likely receives an award, and returns to the base game.

Bonus games that provide players with large awards or the potential to win large awards are especially attractive to players. One way that gaming device manufacturers provide larger or more frequently occurring awards in slot gaming machines is by providing free spins to a player. Several known games provide players a number of free spins at the beginning of the game and spin the reels to obtain awards. This type of bonus game is described in European Patent Application No. EP 0874337A1 and European Patent No. EP 0984409A2. These games are generally versions of a "Spin Until" type bonus game.

EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and to receive several awards. If the player does not obtain a winning symbol combination, the bonus game ends and the player receives the total accumulated awards for the bonus game. Thus, the player spins the reels in the bonus game until they do not obtain a winning combination.

EP 0984409A2 discloses a gaming device wherein the game enables the player to spin a plurality of reels having various symbols attempting to obtain awards. In this bonus game, the player starts the bonus game with a limited number of spins. The player spins the reels until there are no spins remaining. The player receives an award after each spin. The final award in the bonus game is the total of all of the awards accumulated by the player in the game.

Another way that gaming device manufacturers provide larger awards to players is by using multipliers. A multiplier increases the award amount proportionally to the value of the multiplier. For example, a "2×" multiplier pays twice the normal award value. A "3×" multiplier pays three times the normal award value. A multiplier can substantially increase a player's award. Some games also employ an incrementing multiplier as described in the following paragraphs.

U.S. Pat. No. 6,004,207 discloses a slot machine that provides a multiplied payout when certain symbols or symbol combinations appear on the reels and a player bets the maximum amount of coins. This bonus game includes a plurality of reels including several symbols on the reels and a multiplier. The symbols include multiplier symbols and Power Point symbols. Initially, the bonus game sets the multiplier at a predetermined level. The multiplier increments by one level when the player obtains ten Power Point symbols on the reels from one or more spins. After the multiplier increases in value, the player needs ten more Power Point symbols to increment the multiplier again. The gaming device also enables a player to spin the reels to obtain a winning symbol combination. If the player obtains a winning combination, the gaming device provides the player with an award. If the winning combination includes a mnultiplier symbol, the award is multiplied by the mnultiplier. Once an award is multiplied by the multiplier, the multiplier resets to a predetermined level.

Another type of bonus game that includes a multiplied payout is the "GOOD TIMES" gaming device which is manufactured by the assignee of this patent application. This game includes three reels having a plurality of symbols and blank spaces. The symbols include a plurality of "Good Times" symbols. The bonus includes two multiplier groups. A first multiplier group starts at "1×" (or one times the award) and goes up to "12×" (or twelve times the award). The second multiplier group starts at "1×" and goes up to "144×" (or one hundred forty-four times the award). Each time a player spins the reels and obtains three blank spaces on a payline, the designated multiplier in each multiplier increments one level. When the player obtains a winning combination, the player receives an award. If a "Good Times" symbol appears in the winning combination, the player's award is multiplied by the designated multiplier in the first bonus table. If two "Good Times" symbols appear in the winning combination, the player's award is multiplied by the designated multiplier in the second bonus group, It should be appreciated that multipliers may substantially elevate award returns and increase player excitement and enjoyment. Players enjoy playing for high bonus awards. Thus, it is desirable to have a bonus game of a gaming device that provides several opportunities to play a bonus game and has the potential to accumulate large awards.

SUMMARY OF THE INVENTION

The present invention relates in general to a gaming device having a bonus game or scheme, and more particularly to a gaming device having a bonus game or scheme including a plurality of reels, a plurality of symbols on the reels, a plurality of free spins of the reels and a plurality of multipliers associated with the free spins.

In one embodiment, the gaming device provides the player with a plurality of free spins of the reels in the bonus game. A multiplier is associated with each spin of the reels. The multiplier changes and preferably increases after each spin. The processor in the gaming device spins the reels and determines if the player obtains an award based on the combination of symbols on the reels. If the player obtains an award, the award is modified by the multiplier associated with that spin of the reels. In another embodiment, a consolation award is provided to the player if the player does not receive an award after a spin of the reels. In a further embodiment, an accumulated award is provided to the player after there are no spins remaining in the game. The accumulated award may include a plurality of the awards provided to the player or all of the awards provided to the player during the game.

In one embodiment, the multiplier increases by one after each spin. In other embodiments, the multiplier increases by more than one or as desired by the game implementor. In other embodiments, the increase of the multiplier is randomly determined. In one alternative embodiment, the multiplier increases after non-winning games.

In one embodiment, a plurality of reels having several symbols are displayed to a player. The multiplier is also displayed to the player. The player starts the game with a predetermined number of spins in the game. The number of spins may be determined randomly, predefined or picked by playing a sub-game such as by having the player choose from a plurality of masked selections each having an associated number of spins. To start the bonus game, the processor spins or enables the player to initiate a spin of the reels attempting to obtain an award based on a combination of symbols on the reels. If the player obtains an award, the award is modified by the related multiplier. In one embodiment, the multiplier starts at 1× for the first spin and increases with each spin. After each spin, the multiplier is incrementally increased by one. Therefore, each subsequent spin has a larger multiplier. The player continues to spin the reels until there are no spins remaining.

In another embodiment, the gaming device provides the player with additional spins based upon the occurrence of one or more symbols on the reels.

In a further embodiment, the plurality of reels includes a plurality of symbols including at least one, and preferably a plurality of incrementor symbols. The multiplier changes and preferably increases (such as by one) each time the incrementor symbol appears on the display or on a payline associated with the reels. In another alternative embodiment, if one or more incrementor symbols are displayed by the reels, the multiplier increases by the number of incrementor symbols that are displayed on the reels.

In one embodiment, the multiplier of the present invention is employed in a poker game. In another embodiment, the multiplier of the present invention is employed in a keno game.

In one alternative embodiment, the multiplier is predetermined by the processor at the beginning of the bonus game. Then, the multiplier may increase by a predetermined amount or a random amount after each game.

In another alternative embodiment, the multiplier is randomly determined at the beginning of the bonus game and then randomly determined after each subsequent game. The processor or player may select the new multiplier. In one embodiment, the gaming device displays a plurality of player selectable selections to the player. The selections are masked or hidden from the player and when selected, display a multiplier to the player. The multipliers are randomly associated with the selections. The player may pick one or a plurality of selections. In another embodiment, the selections are only displayed to the player after a specific symbol combination occurs on the reels.

In one alternative embodiment, a light display is mounted to the gaming device and displays the multiplier to the player after the processor randomly selects the multiplier.

In another alternative embodiment, different increases of the multiplier and different probabilities are associated with different incrementor symbols such that one incrementor symbol has a greater probability of appearing on the reels than another incrementor symbol.

In an alternative embodiment, there is a weighted probability of increasing the multiplier by more than one.

It is therefore an advantage of the present invention to provide a gaming device having a free game bonus with a multiplier that increments after each game.

Another advantage of the present invention to provide a gaming device including a multiplier that increments after each game to provide larger awards to players.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
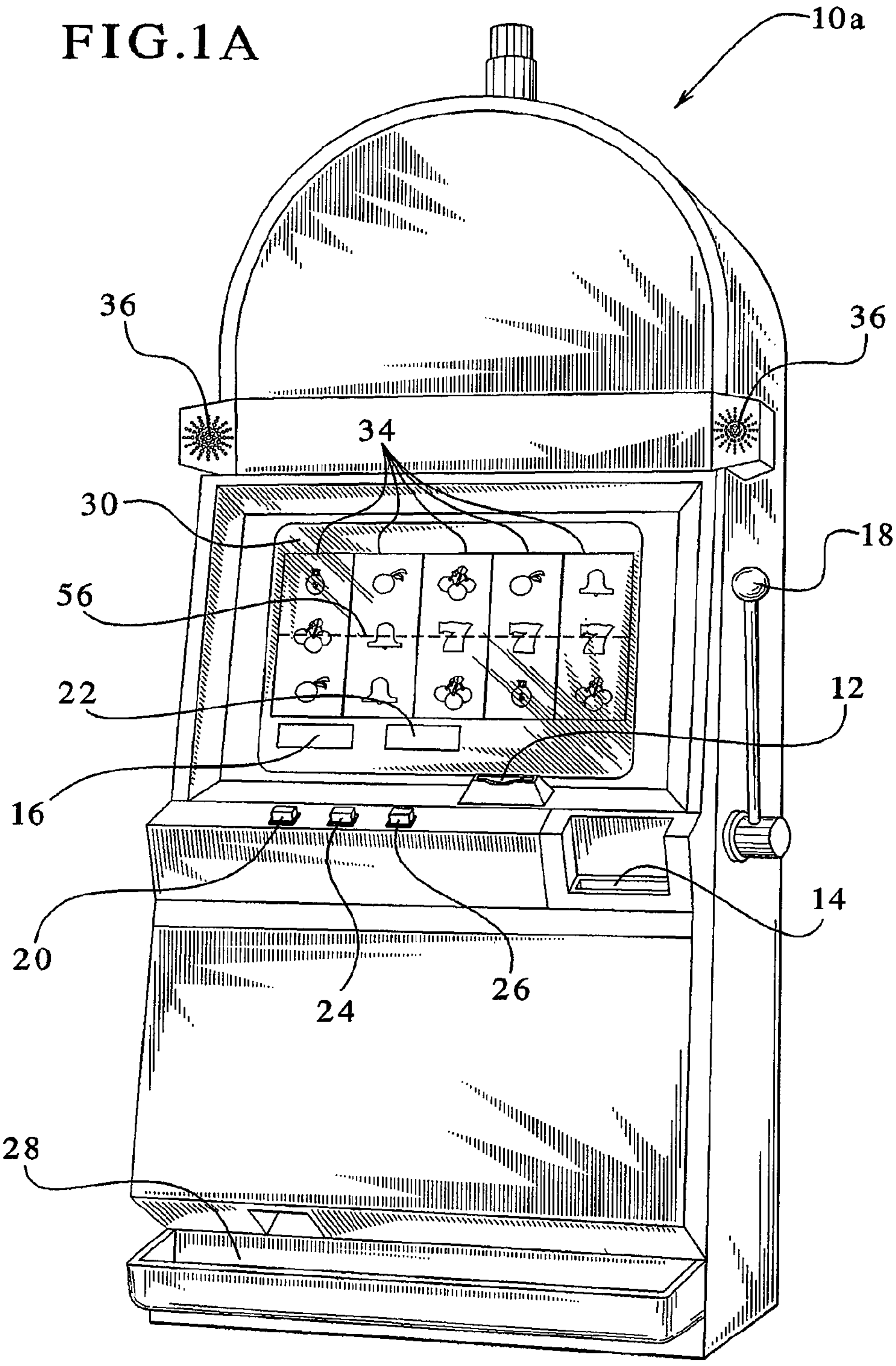
FIG. 1A is a front perspective view of one embodiment of the gaming device of the present invention.
Figure 1B:
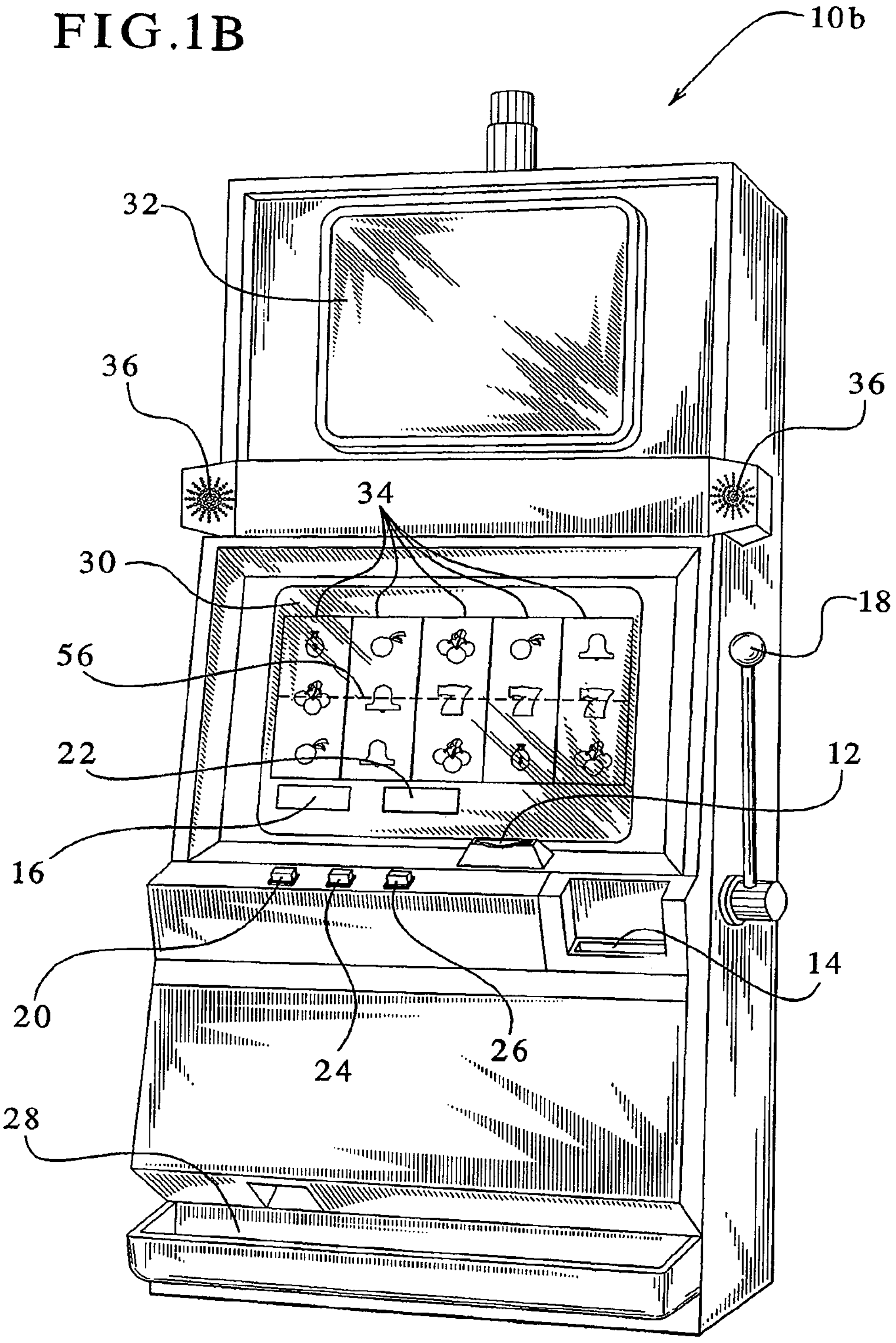
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is, in one embodiment, a slot machine having the controls, displays and features of a conventional slot machine. It is constructed so that a player can operate it while standing or sitting, and gaming device 10 is preferably mounted on a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use a desktop or laptop personal computer or other computerized platform.

Gaming device 10 can incorporate any primary game such as slot, poker, blackjack or keno, any of their bonus triggering events and any of the bonus round games. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34, such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
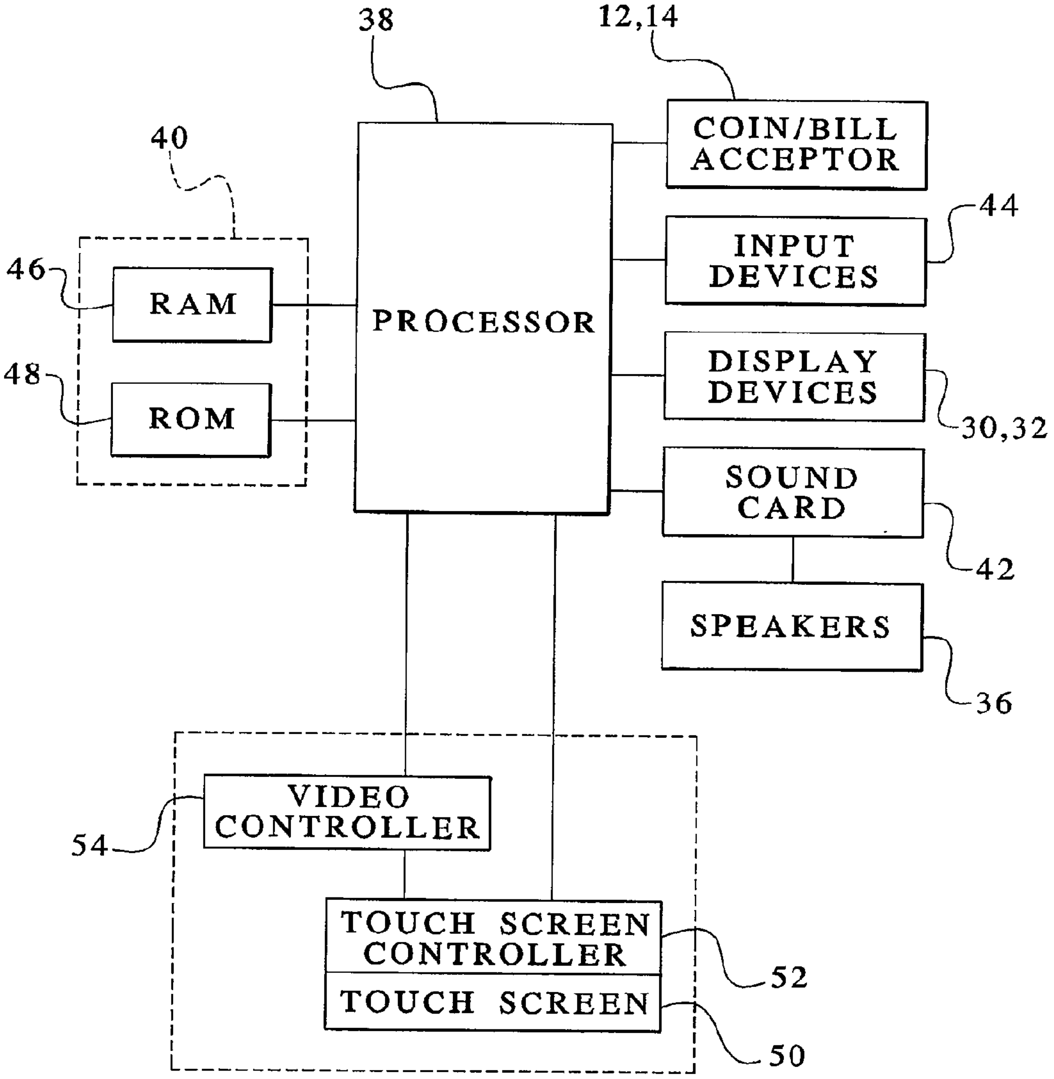
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively, and/or individually, referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Free Game Bonus

Figure 3:
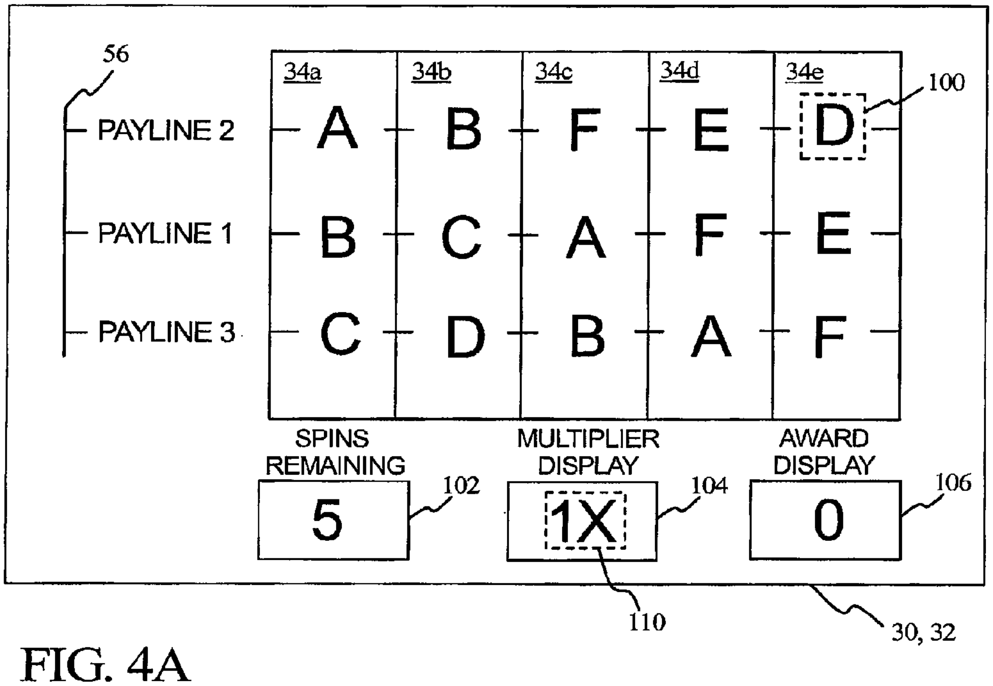
FIG. 3 is an enlarged front elevation view of a display illustrating one embodiment of the present invention.

Referring now to FIG. 3, one embodiment of the present invention includes a plurality of reels 34*a* to 34*e* and one or more associated paylines 56 displayed by a video monitor 30 or 32 (FIG. 1A or 1B). Each reel 34 has a plurality of symbols A through F generally designated by numeral 100. It should be appreciated that the symbols may be any suitable symbol. A spin remaining display 102 initially indicates the number of free spins provided to the player by the processor to start the bonus game. The number of free spins or activations could be predetermined, randomly determined, or based on various factors such as the player's wager in the base game. Thereafter, the spins remaining display 102 indicates the number of free spins remaining in the bonus game. It should be appreciated that the player may be provided with additional free spins during a game, where the free spins are based on the occurrence of one or more symbols on the reels.

The multiplier display 104 displays the multiplier associated with a particular free spin or activation of the reels. In one embodiment, the multiplier associated with each free spin increases by a predetermined amount. In another embodiment, the amount of the increase is an amount selected from a range greater than zero and less than ten after each free spin of the reels. In a further embodiment, the multiplier associated with each free spin increases by a random amount.

The award display 106 displays the total award, or the value of the accumulated awards, during the bonus game. The award value indicated by award display 106 at the end of a game is the award that the player receives for that bonus game.

Referring now to FIGS. 4A through 4E, an example of this embodiment of the present invention is illustrated where the gaining device provides a player with five free spins and a "1×" multiplier to begin the bonus game. In this embodiment, the game starts with a "1×" multiplier. However, it should be appreciated that the game could start with any multiplier desired by the game implementor. It should also be appreciated that the starting multiplier could be randomly determined or based on another factor such as the player's wager in the primary game. It should be appreciated that any pay table or award table may be used in the bonus game. The pay table for this example is as follows: three of the same symbols along payline one awards twenty-five, four of the same symbols along payline one awards fifty, and five of the same symbols along payline one awards one hundred to a player. The bonus game is not limited to payline one and it should be appreciated that another payline or combination of paylines 56 may be used to trigger the bonus award.

In one embodiment, a consolation award is provided to the player if the player does not receive an award after a free spin. In one aspect of this embodiment, the consolation award is predetermined by the processor. In another aspect, the consolation award is randomly determined by the processor. In a further aspect of the present invention, the consolation award is based on the multiplier associated with each free spin of the reels.

In another embodiment, an accumulated award is provided to the player after there are no spins remaining in the game. The accumulated award is based on the awards, if any, provided to the player after each spin. The accumulated award may include a plurality of the awards provided to the player or all of the awards provided to the player.

Figure 4A:
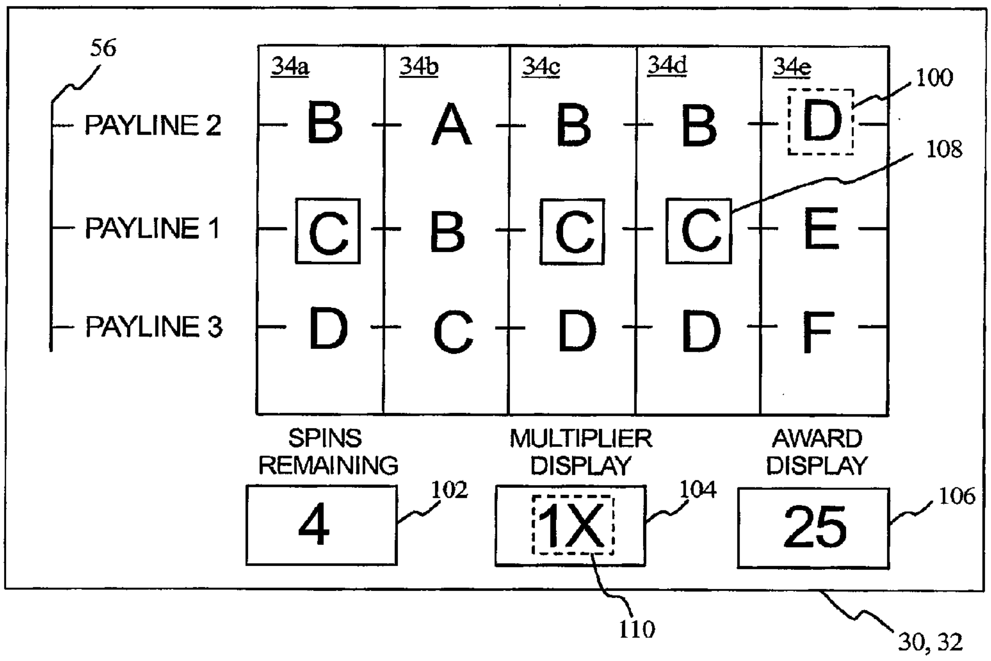
FIGS. 4A to 4E are enlarged front elevation views of a display illustrating an example game of one embodiment of the present invention.

The player starts the secondary or bonus game by spinning the reels. FIG. 4A illustrates the first spin by the player in the bonus game. In the first spin, the player obtained three "C" symbols 108 along payline one. According to the pay table described above, the player receives an award of twenty-five. Because the multiplier 110 is "1×" or multiplies the award value by one, the player's award for that spin remains twenty-five. The award value, twenty-five, is transferred to the award display 106 as illustrated in FIG. 4A. The player now has four spins remaining as shown in spin display 102 as illustrated in FIG. 4A. The processor increments the multiplier by one prior to the next free spin. The multiplier is "2×" for the next free spin.

Figure 4B:
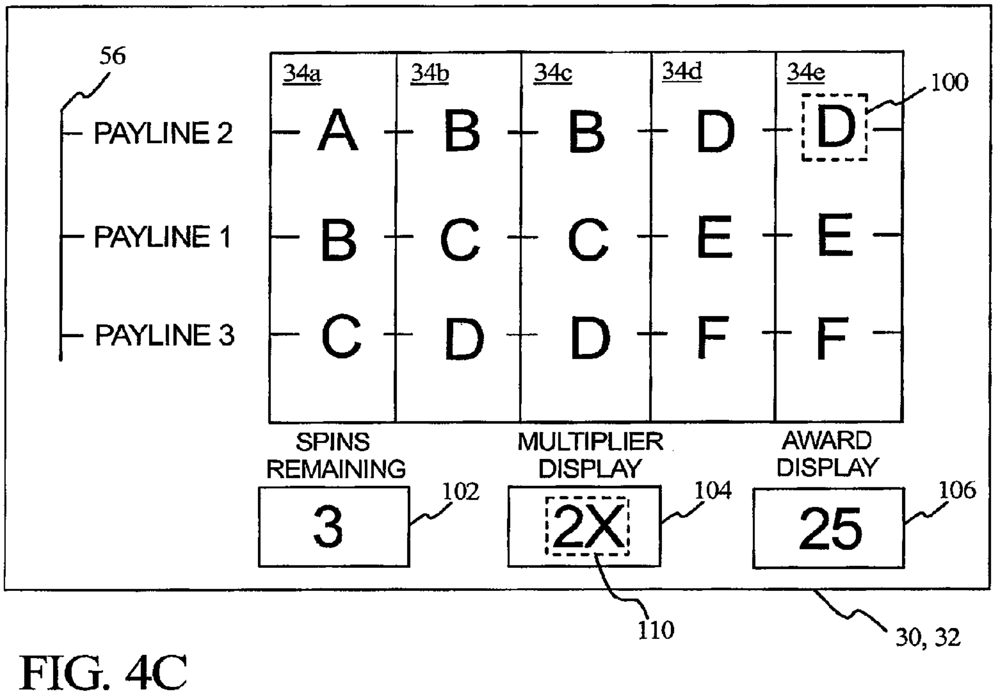

Referring now to FIG. 4B, the player uses their second free spin to spin the reels 34 in the bonus game. After spinning the reels, the player only obtained two "C" symbols and two "E" symbols on payline one. Because this combination of symbols is not an award combination, the player does not receive an award for this spin. Because the player did not obtain an award after the second spin, the player's award total does not change as indicated by the award display 106. The player now has only three spins remaining in the bonus game as indicated by spin remaining display 102. The processor increments the multiplier prior to the next free spin. The multiplier is now "3×."

Figure 4C:
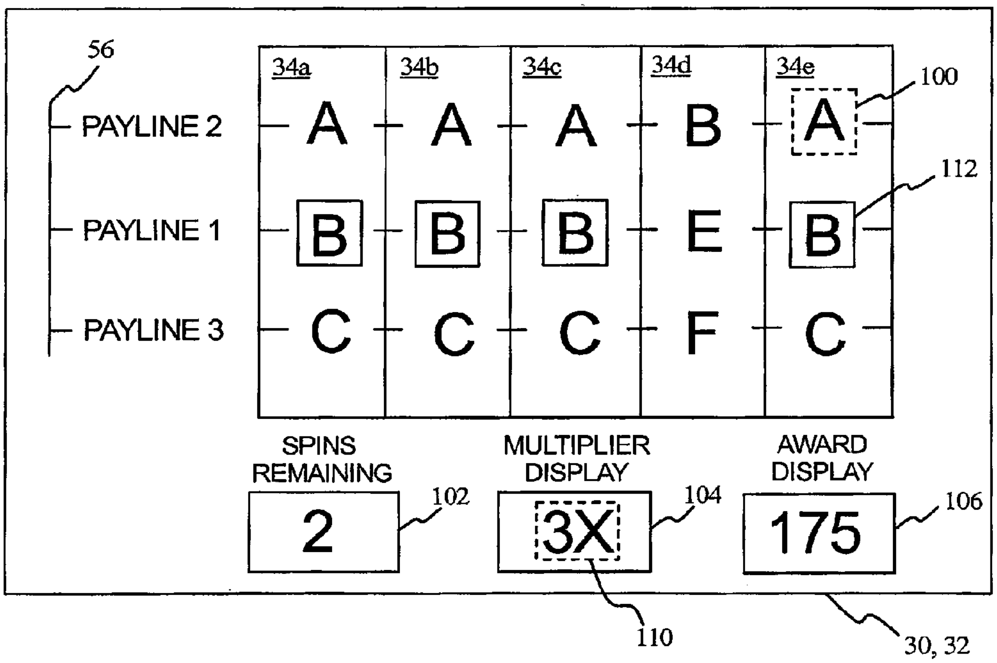

Referring to FIG. 4C, the multiplier 110 for this spin is "3×," or three times an award value, as indicated by multiplier display 104. It should be appreciated that in this embodiment, the multiplier continues to increment by one after each spin, regardless of whether the player obtains an award or not. The multiplier may alternatively change as discussed below. The player spins the reels 34 again and obtains four "B" symbols 112 along payline one. The four "B" symbols provide an award of fifty to the player. In addition, the award value, fifty, is multiplied by three because the multiplier for this spin is "3×." Thus, the player receives a total award of one hundred fifty for the third spin in the bonus game. Furthermore, the award brings the player's total award to one hundred seventy-five as shown in award display 106. This spin shows how a player may accumulate much larger awards based on the incrementing multiplier even though some spins do not result in awards. The player has two free spins remaining as indicated by spin remaining display 102. The gaming device increments the multiplier to "4×" prior to the next free spin.

Figure 4D:
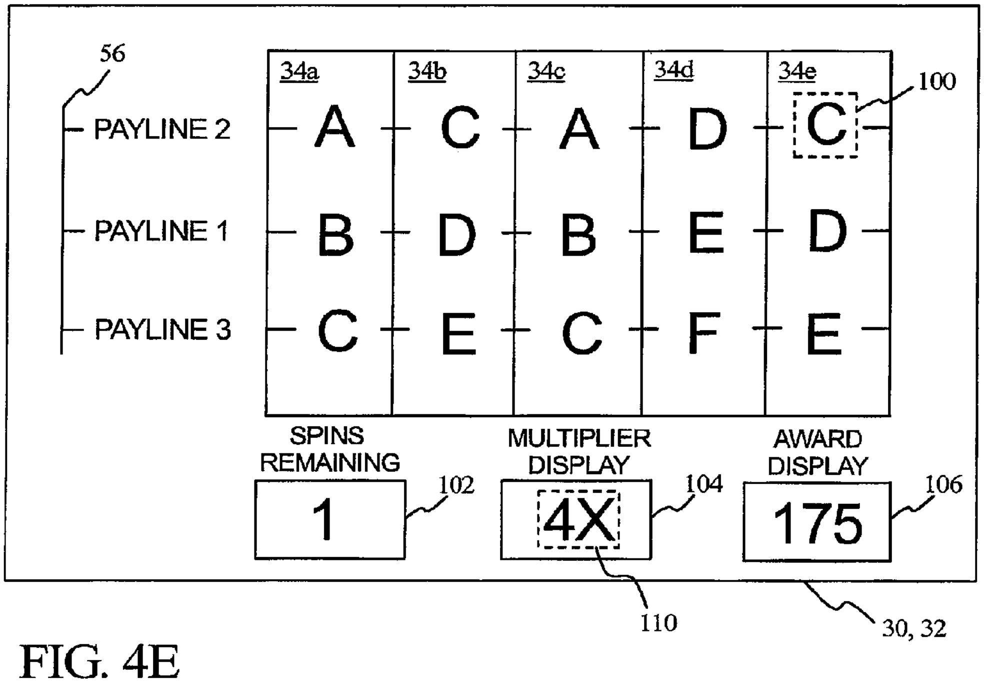

Referring now to FIG. 4D, the potential award for this spin increases substantially because the multiplies 110 continues to increment after each spin. The multiplier is "4×" which will multiply any award that the player receives for this spin by four. The player spins the reels 34, however, the player fails to obtain any award after this spin. The total award, one hundred seventy-five, remains unchanged as shown in award display 106 and the player has only one spin remaining in the bonus game. The gaming device increments the multiplier 110 to "5×" before the next free spin.

Figure 4E:
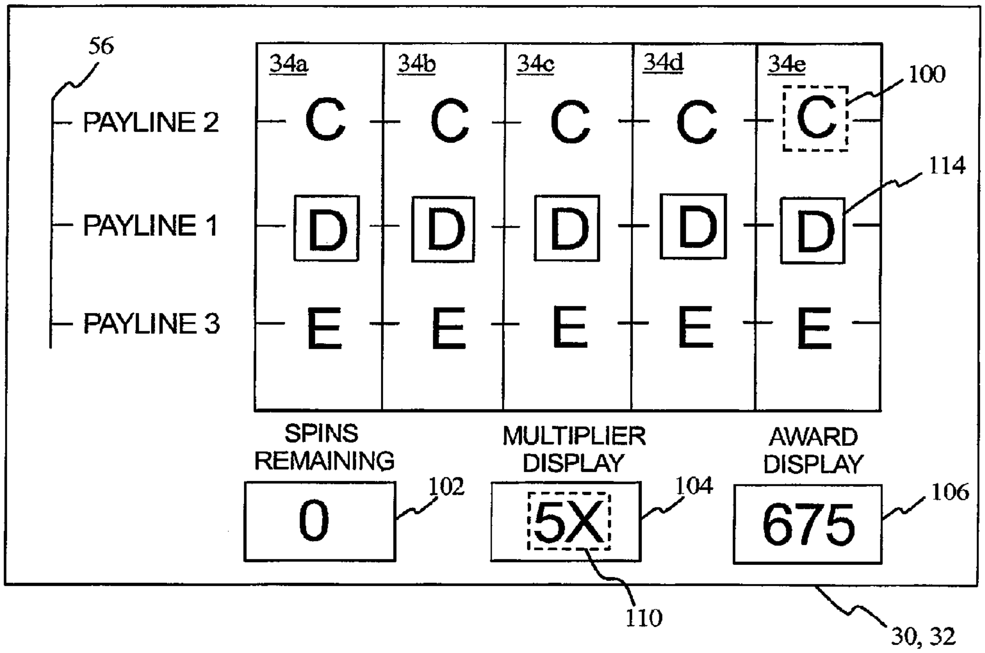

Referring to FIG. 4E, the player spins the reels for the final time in the bonus game. On their final free spin in the bonus game, the player obtained five "D" symbols 114 along payline one. In this particular game, five identical symbols across payline one pays an award of one hundred. Also, the multiplier is "5×" for this spin. Therefore, the award for this spin, one hundred, is multiplied by five to achieve a total award of five hundred for this spin. The award is added to the total award in award display 106 to give the player a final award total of six hundred seventy-five for the bonus game. The player does not have any free spins remaining in the bonus game as indicated by spin remaining display 102. Thus, the bonus game ends. The final spin in this bonus game illustrates how one spin can result in a very large award.

The above example illustrated in FIGS. 4A to 4E, shows how the incremental effect of the multiplier 110 increases the level of player excitement and enjoyment in the bonus game. Potentially, a player might not obtain an award combination on any spin in the bonus game except for the last spin. Since the last spin has a larger multiplier than the previous spins, the player still will receive a large award. Therefore, the player's excitement builds as they progress further into the bonus game of the present invention because the potential for larger awards also builds based on the increasing multiplier.

In one embodiment of the present invention, the multiplier increments after each game, regardless of whether the player obtained a winning combination or not. Because the multiplier continues to increment even after non-winning combinations, the player still may obtain large awards in the bonus game, which increases the player's excitement and enjoyment of the game. For example, a bonus game begins with a multiplier of "1×" and increments by "1×" after each free spin. If a player does not obtain an award combination until the player's fourth free spin, the player still receives a large award because the multiplier in the fourth free spin is "4×."

In another embodiment of the present invention, the multiplier 110 increases by a predetermined amount that is greater than one after each free spin in the bonus game. For example, the multiplier begins a bonus game at "1×" and increases by "2×" after each free spin of the reels. After the first spin the multiplier increases to "3×," after the second spin the multiplier increases to "5×" and so forth. It should be appreciated that the multiplier can also increase by a predetermined multiplication factor. For example, the multiplier can increase by two or double after each free spin. The multiplier starts the bonus game at "1×" then increases to "2×" after the first free spin, "4×" after the second free spin and so forth. In a further embodiment, the multiplier increases by a random amount after each free spin. The random amount is determined by the processor. In yet another embodiment, the multiplier increases by a predetermined amount after a predetermined number of free spins greater than one. In still a further embodiment of the present invention, the multiplier increases by a random amount after a random number of free spins as determined by the processor.

Figure 5A:
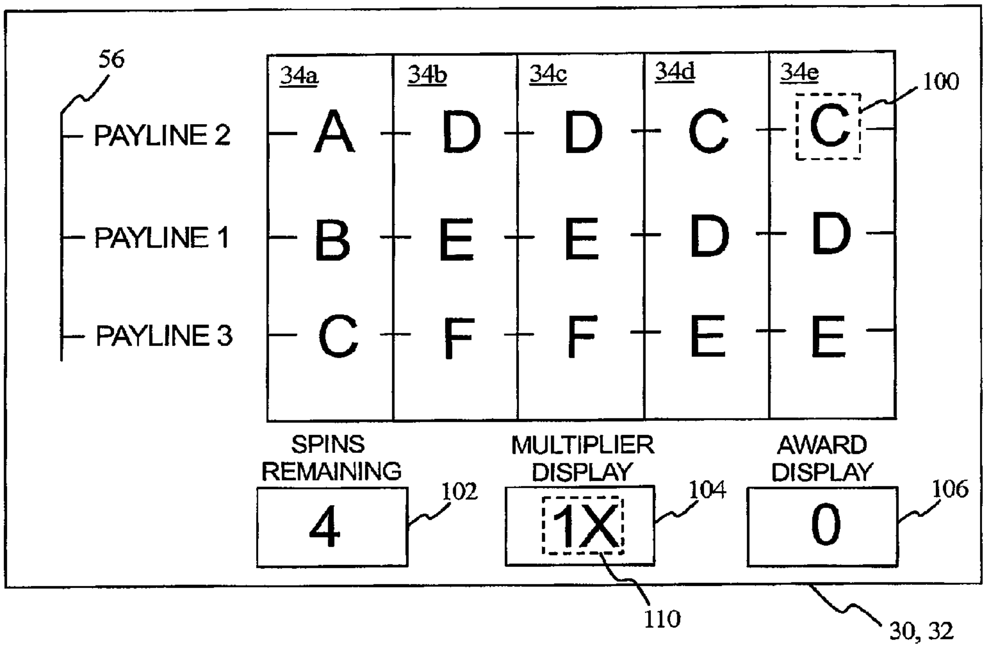
FIGS. 5A to 5D are enlarged front elevation views of another embodiment of the present invention illustrating having one or more incrementor symbols.
Figure 5B:
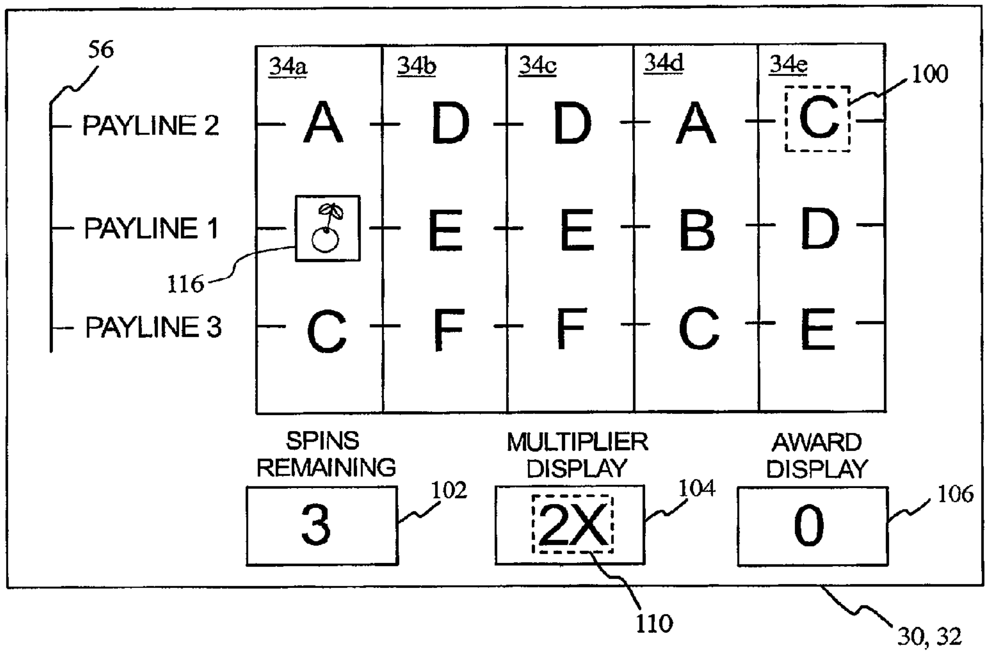
Figure 5C:
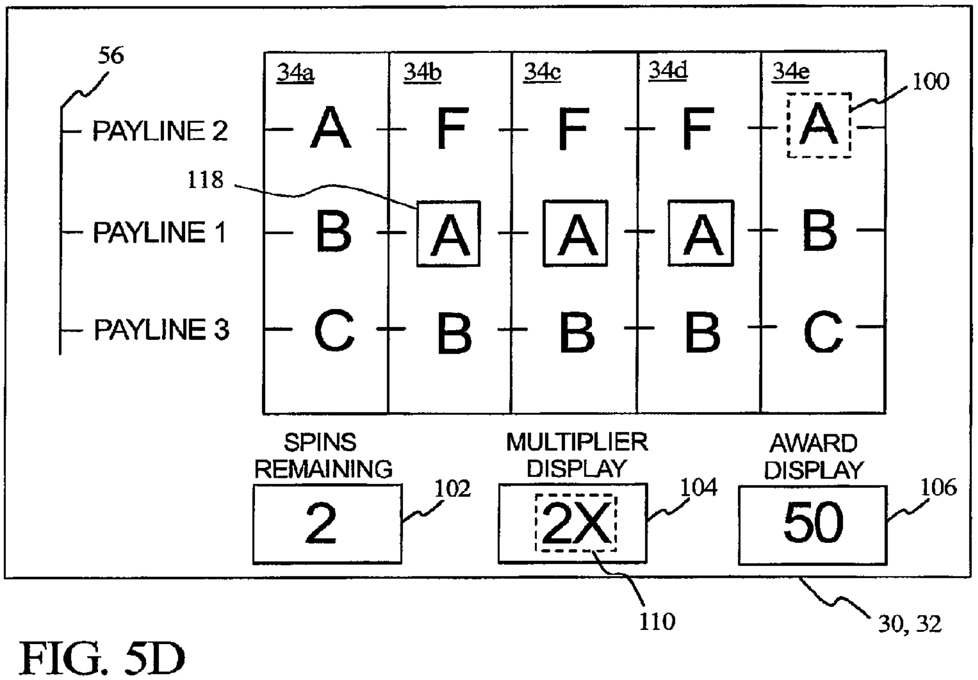

Referring now to FIGS. 5A, 5B, and 5C, another embodiment of the present invention is illustrated where the multiplier 110 additionally or alternatively increments when a particular symbol 100 or a symbol combination appears on the reels or any payline 56 associated with the reels. It should be appreciated that the symbol could appear on a specific payline or in any other manner desired by the game implementor. In this embodiment, the reels include symbols A through F, plus incrementing symbols 116 designated by a cherry symbol in this example. It should be appreciated that the incrementor may be any suitable symbol desired by the game implementor. A player spins the reels 34 attempting to obtain an award plus one or more incrementor symbols 116. The game may display player one incrementor at a time and accordingly increase the multiplier 110 by only one after a spin. However, it is contemplated that a player may receive more than one incrementor in a spin. In one embodiment, the incrementors are associated with probabilities such that one incrementor symbol has a greater probability of appearing on the reels than two or more incrementor symbols. In one embodiment, the multiplier 110 increments only when an incrementor symbol appears on a payline. In one alternative embodiment, there is a weighted probability of increasing the incrementor by more than one when an incrementor symbol is displayed.

In FIG. 5A, the bonus game begins with four spins as indicated by spins remaining display 102, a multiplier of "1×" as indicated by multiplier display 110, and a total award of zero as indicated by the award display 106. In FIG. 5B, the gaming device or player spins the reels 34 and obtains an incrementor symbol 116, designated by a cherry symbol in this example, on payline one. The player does not obtain a winning symbol combination in this spin. Therefore, the total award remains at zero as indicated by the award display 106 and the multiplier 110 increments by one from "1×" to "2×" as indicated by multiplier display 104. The multiplier remains "2×" until the player obtains another incrementor symbol on a payline.

Figure 5D:
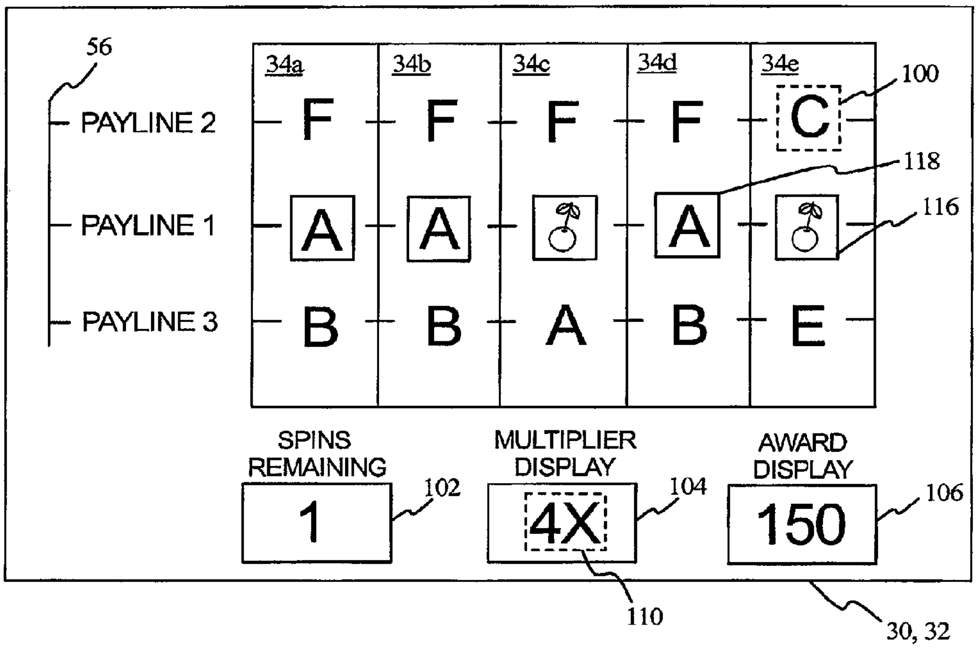

Referring to FIG. 5C, the gaming device or player spins the reels 34 and does not obtain an incrementor symbol, or cherry symbol, on payline one. Therefore, the multiplier 110 remains unchanged as indicated by the multiplier display 104. However, the player does obtain a winning symbol combination in this spin. The winning symbol combination is three "A" symbols 118 on payline one and provides an award of twenty-five. Therefore, the award, twenty-five, is multiplied by the multiplier "2×" to obtain the total award of fifty as indicated by the award display 106. In this embodiment, only the award provided from a particular spin is multiplied by the multiplier for that spin, In FIG. 5D, the gaming device or player spins the reels. The player obtains three "A" symbols 118 along payline ones. Also, the player obtained two incrementor symbols 116 on a payline in that spin. Thus, the multiplier 110 increments two times (for each incrementor symbol) or from "2×" to "4×." The player's award in the bonus game, twenty-five, is multiplied by four to achieve a total award for this spin of one hundred. The player's new total award in the bonus game becomes one hundred fifty, as indicated by award display 106. The player will continue to spin the reels 34 until there are no spins remaining in the bonus game.

It should be appreciated that the present invention could be employed in other games such as poker, blackjack, keno and other primary or secondary games.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

at least one display device;

an acceptor configured to receive a physical item associated with a monetary value;

at least one input device;

at least one processor; and at least one memory device that stores a plurality of instructions that, when executed by the at least one processor, cause the at least one processor to:

establish a credit balance based on the monetary value of the physical item responsive to receipt, via the acceptor, of the physical item;

place a wager on a play of a first game responsive to receipt, via the at least one input device, of a wager input, the credit balance decreasable by the wager;

determine an outcome for the play of the first game;

cause the at least one display device to display the outcome for the play of the first game;

determine any awards associated with the play of the first game;

cause the at least one display device to display any determined awards for the play of the first game, the credit balance increasable by any determined awards;

responsive to an occurrence of a triggering event:

determine an outcome for a first play of a second game;

cause the at least one display device to display the outcome for the first play of the second game;

determine whether the outcome for the first play of the second game is one of a plurality of winning outcomes;

responsive to determining that the outcome for the first play of the second game is one of the plurality of winning outcomes, determine and cause the at least one display device to display a first award for the first play of the second game based on the outcome for the first play of the second game and a randomly determined one of a first plurality of modifiers, the credit balance increasable by any determined first award;

determine an outcome for a second play of the second game;

cause the at least one display device to display the outcome for the second play of the second game;

determine whether the outcome for the second play of the second game is one of the winning outcomes;

determine whether a condition is satisfied;

responsive to determining that the outcome for the second play of the second game is one of the winning outcomes and that the condition is satisfied, determine and cause the at least one display device to display a second award for the second play of the second game based on the outcome for the second play of the second game and a randomly determined one of a second plurality of modifiers, the credit balance increasable by any determined second award, wherein an average value of the second plurality of modifiers is greater than an average value of the first plurality of modifiers and wherein none of the second plurality of modifiers is less than any of the first plurality of modifiers; and responsive to determining that the outcome for the second play of the second game is one of the winning outcomes and that the condition is not satisfied, determine and cause the at least one display device to display a third award for the second play of the second game based on the outcome for the second play of the second game and a randomly determined one of the first plurality of modifiers, the credit balance increasable by any determined third award; and initiate a payout responsive to receipt, via the at least one input device, of a cashout input.

2. The gaming system of claim 1, wherein the first game and the second game are a same game.

3. The gaming system of claim 1, wherein each of the first and second pluralities of modifiers includes a multiplier.

4. The gaming system of claim 1, wherein the condition is satisfied when the displayed outcome for the first play of the second game is one of the plurality of winning outcomes.

5. The gaming system of claim 1, wherein the second game is associated with a plurality of reels and each play of the second game includes an activation of the reels.

6. The gaming system of claim 1, wherein the first game and the second game are different games.

7. A method of operating a gaming system, the method comprising:

establishing, by at least one processor, a credit balance based on a monetary value of a physical item responsive to receipt, via an acceptor, of the physical item;

placing, by the at least one processor, a wager on a play of a first game responsive to receipt, via at least one input device, of a wager input, the credit balance decreasable by the wager;

determining, by the at least one processor, an outcome for the play of the first game;

causing, by the at least one processor, at least one display device to display the outcome for the play of the first game;

determining, by the at least one processor, any awards associated with the play of the first game;

causing, by the at least one processor, the at least one display device to display any determined awards for the play of the first game, the credit balance increasable by any determined awards;

responsive to an occurrence of a triggering event:

determining, by the at least one processor, an outcome for a first play of a second game;

causing, by the at least one processor, the at least one display device to display the outcome for the first play of the second game;

determining, by the at least one processor, whether the outcome for the first play of the second game is one of a plurality of winning outcomes;

responsive to determining that the displayed outcome for the first play of the second game is one of the plurality of winning outcomes, determining, by the at least one processor, and causing, by the at least one processor, the at least one display device to display a first award for the first play of the second game based on the outcome for the first play of the second game and a randomly determined one of a first plurality of modifiers, the credit balance increasable by any determined first award;

determining, by the at least one processor, an outcome for a second play of the second game;

causing, by the at least one processor, the at least one display device to display the outcome for the second play of the second game;

determining, by the at least one processor, whether the outcome of the second play of the second game is one of the winning outcomes;

determining, by the at least one processor, whether a condition is satisfied;

responsive to determining that the outcome for the second play of the second game is one of the winning outcomes and that the condition is satisfied, determining, by the at least one processor, and causing, by the at least one processor, the at least one display device to display a second award for the second play of the second game based on the outcome for the second play of the second game and a randomly determined one of a second plurality of modifiers, the credit balance increasable by any determined second award, wherein an average value of the second plurality of modifiers is greater than an average value of the first plurality of modifiers and wherein none of the second plurality of modifiers is less than any of the first plurality of modifiers; and responsive to determining that the displayed outcome for the second play of the second game is one of the winning outcomes and that the condition is not satisfied, determining, by the at least one processor, and causing, by the at least one processor, the at least one display device to display a third award for the second play of the second game based on the outcome for the second play of the second game and a randomly determined one of the first plurality of modifiers, the credit balance increasable by any determined third award; and initiating, by the at least one processor, a payout responsive to receipt, via the at least one input device, of a cashout input.

8. The method of claim 7, wherein the first game and the second game are a same game.

9. The method of claim 7, wherein each of the first and second pluralities of modifiers includes a multiplier.

10. The method of claim 7, wherein the condition is satisfied when the displayed outcome for the first play of the second game is one of the plurality of winning outcomes.

11. The method of claim 7, wherein the second game is associated with a plurality of reels and each play of the second game includes an activation of the reels.

12. The method of claim 7, wherein the first game and the second game are different games.

13. The method of claim 7, which is at least partially provided through a data network.

14. The method of claim 13, wherein the data network is an internet.

15. A non-transitory computer readable medium that stores a plurality of instructions which, when executed by at least one processor, cause the at least one processor to:

establish a credit balance based on a monetary value of a physical item responsive to receipt, via an acceptor, of the physical item;

place a wager on a play of a first game responsive to receipt, via at least one input device, of a wager input, the credit balance decreasable by the wager;

determine an outcome for the play of the first game;

cause at least one display device to display the outcome for the play of the first game;

determine any awards associated with the play of the first game;

cause the at least one display device to display any determined awards for the play of the first game, the credit balance increasable by any determined awards;

responsive to an occurrence of a triggering event:

determine an outcome for a first play of a second game;

cause the at least one display device to display the outcome for the first play of the second game;

determine whether the outcome for the first play of the second game is one of a plurality of winning outcomes;

responsive to determining that the outcome for the first play of the second game is one of the plurality of winning outcomes, determine and cause the at least one display device to display a first award for the first play of the second game based on the outcome for the first play of the second game and a randomly determined one of a first plurality of modifiers, the credit balance increasable by any determined first award;

determine an outcome for a second play of the second game;

cause the at least one display device to display the outcome for the second play of the second game;

determine whether the outcome for the second play of the second game is one of the winning outcomes;

determine whether a condition is satisfied;

responsive to determining that the outcome for the second play of the second game is one of the winning outcomes and that the condition is satisfied, determine and cause the at least one display device to display a second award for the second play of the second game based on the outcome for the second play of the second game and a randomly determined one of a second plurality of modifiers, the credit balance increasable by any determined second award, wherein an average value of the second plurality of modifiers is greater than an average value of the first plurality of modifiers and wherein none of the second plurality of modifiers is less than any of the first plurality of modifiers; and responsive to determining that the outcome for the second play of the second game is one of the winning outcomes and that the condition is not satisfied, determine and cause the at least one display device to display a third award for the second play of the second game based on the outcome for the second play of the second game and a randomly determined one of the first plurality of modifiers, the credit balance increasable by any determined third award; and initiate a payout responsive to receipt, via the at least one input device, of a cashout input.

16. The non-transitory computer readable medium of claim 15, wherein the first game and the second game are a same game.

17. The non-transitory computer readable medium of claim 15, wherein each of the first and second pluralities of modifiers includes a multiplier.

18. The non-transitory computer readable medium of claim 15, wherein the condition is satisfied when the displayed outcome for the first play of the second game is one of the plurality of winning outcomes.

19. The non-transitory computer readable medium of claim 15, wherein the second game is associated with a plurality of reels and each play of the second game includes an activation of the reels.

20. The non-transitory computer readable medium of claim 15, wherein the first game and the second game are different games.

* * * * *